J. F. BLACK.
SHEARS.
APPLICATION FILED APR. 18, 1914.
1,134,814.
Patented Apr. 6, 1915.
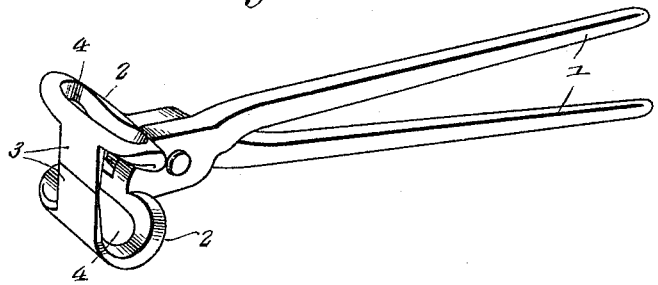
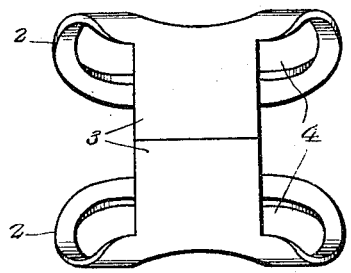
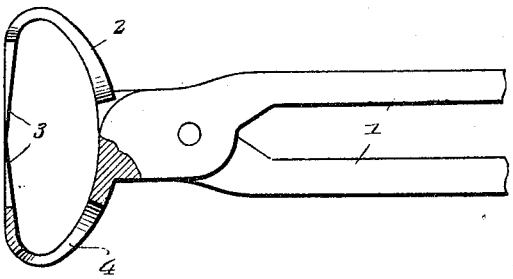
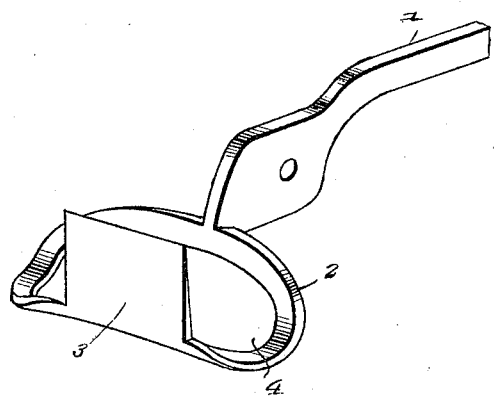
Inventor
James F. Black
Witnesses
J. H. Crawford,
U. B. Hillyard.
By Victor J. Evans
Attorney

UNITED STATES PATENT OFFICE.

JAMES FREDRICK BLACK, OF PROPHETSTOWN, ILLINOIS, ASSIGNOR OF ONE-HALF TO HARRY B. RICHMOND, OF PROPHETSTOWN, ILLINOIS.

SHEARS.

1,134,814. Specification of Letters Patent. Patented Apr. 6, 1915.

Application filed April 18, 1914. Serial No. 832,887.

*To all whom it may concern:*

Be it known that I, JAMES FREDRICK BLACK, a citizen of the United States, residing at Prophetstown, in the county of Whiteside and State of Illinois, have invented new and useful Improvements in Shears, of which the following is a specification.

The present invention provides a tool particularly adapted for the use of farriers whereby the labor of horse shoeing is greatly facilitated since the workman is enabled to observe the action of the hoof paring pincers when in operation without requiring the head to be lowered and extended to one side in order to observe the action of the ordinary hoof trimmer when in use.

The invention consists of a hoof paring pincers having the jaws or heads formed with openings which serve the double purpose of providing a ready escape for the parings as well as to admit of the work being readily observed at all times without entailing the discomfort occasioned by the bending of the head and the extending of the same to one side in order to observe the work.

The invention consists of the novel features, details of construction and combination of parts, which hereinafter will be more particularly set forth, illustrated and claimed.

In the drawings hereto attached:—Figure 1 is a perspective view of a pair of hoof trimming shears embodying the invention. Fig. 2 is a front view. Fig. 3 is a side view partly in section and having the rear ends of the handles broken away. Fig. 4 is a perspective view of the cutting head of one of the handles.

Corresponding and like parts are referred to in the following description, and indicated in all the views of the drawings, by the same reference characters.

The shears or hoof paring pincers embody similar members which are pivotally connected near one end, such members cross at their point of pivotal connection whereby the blades are brought together when the rear ends of the handles or members are pressed together. Each of the members comprise a handle 1, a head 2 and a blade 3. The head 2 is transversely elongated and is formed with an opening 4. The blade 3 is located at the outer or forward end of the head 2 and is centrally disposed. The blade 3 does not extend the entire length of the head, hence the cutting edge of the blades are readily observable through the opening 4 of the uppermost head. The tool is adapted to be used with either head or member uppermost, hence the advantage of having an opening 4 in each of the heads.

When the tool is in operation the work is observable through the opening 4 and it is not necessary for the farrier to lower the head and extend the same to one side in order to see between the cutters as is the case when using hoof trimmers of the ordinary type having solid heads. It is further noted that the opening 4 in the lower head provides a clearance for the escape of parings thereby preventing the same accumulating upon the lower cutting and requiring manipulation of the tool to dislodge the same.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

A hoof trimmer including companion pivotally connected skeleton jaws, each substantially U-shaped in cross-section and having a cutting blade depending from one side thereof, the cutting blades on the jaws being alined and of lesser length than the respective jaws, as and for the purpose specified.

In testimony whereof I affix my signature in presence of two witnesses.

JAMES FREDRICK BLACK.

Witnesses:
W. I. SMITH,
T. F. BARRADELL.